UNITED STATES PATENT OFFICE.

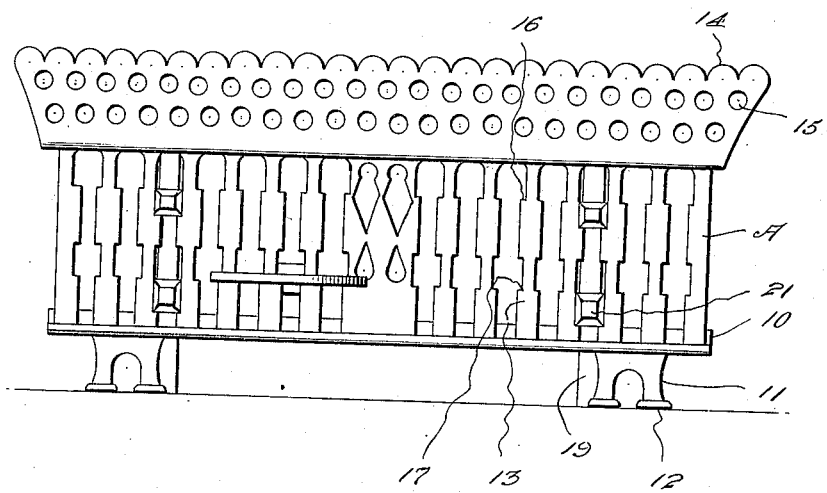
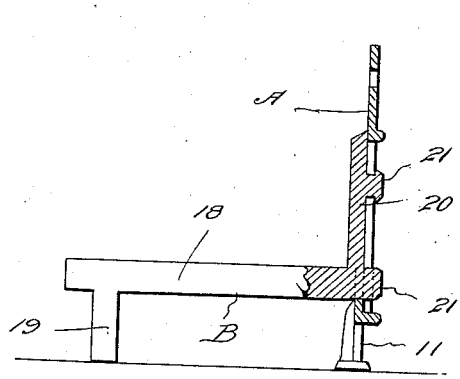
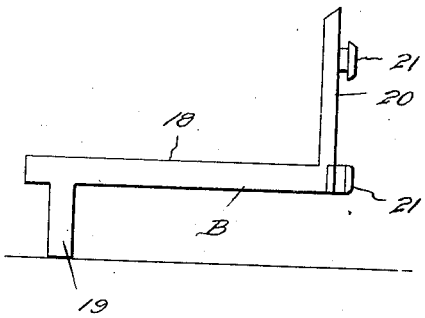
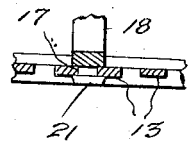
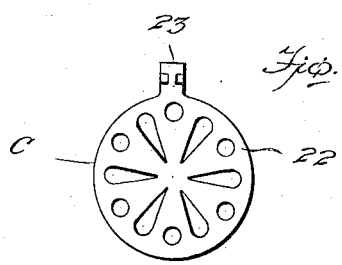

WILLIAM ARCHER PERKINS, OF RIDGEWAY, SOUTH CAROLINA.

GRATE.

1,310,371.  Specification of Letters Patent.  Patented July 15, 1919.

Application filed August 29, 1916. Serial No. 117,446.

*To all whom it may concern:*

Be it known that I, WILLIAM A. PERKINS, a citizen of the United States, residing at Ridgeway, in the county of Fairfield and State of South Carolina, have invented certain useful Improvements in Grates, of which the following is a specification, reference being had therein to the accompanying drawing.

The invention relates to grates, and more particularly to the class of fire place grates of an adjustable and knock down type.

The primary object of the invention is the provision of a grate of this character wherein the same can be readily adjusted so as to fit different sizes of fire places for use, and also can be readily knocked down for disuse.

Another object of the invention is the provision of a grate of this character wherein it possesses minimum parts which can be readily locked with each other for the setting up of the grate for use, and when said grate is set up, it will eliminate the falling of burnt wood or any part of the fire on to the hearth of the fire place thereby preventing possible conflagrations resultant therefrom.

A further object of the invention is the provision of a grate of this character wherein the supports of the fire or fuel to be burned are readily separable from the front guard section of said grate, so in the event of the supports wearing out, new ones can be substituted with despatch, thereby increasing the life of the grate.

A still further object of the invention is the provision of a grate of this character wherein the fuel supports are readily adjustable and also the front guard section of said grate can be readily removed from the support, so that new parts of the grate can be substituted when the occasion requires.

A still further object of the invention is the provision of a grate of this character wherein a rest is adjustably connected with the front guard of the grate to permit the supporting of a cooking utensil for the cooking of food stuffs in the grate.

A still further object of the invention is the provision of a grate of this character wherein the construction thereof is novel in form, so as to permit the use of the grate in different sizes of fire places, and also to allow the convenient setting up or knocking down of the grate when the occasion requires.

A still further object of the invention is the provision of a grate of this character which is extremely simple in construction, thoroughly reliable and efficient in its purpose, strong, durable, and inexpensive in manufacture.

With these and other objects in view, the invention consists in the features of construction, combination and arrangement of parts, as will be hereinafter fully described, illustrated in the accompanying drawing, and pointed out in the claim hereunto appended.

In the accompanying drawing:

Figure 1 is a front elevation of a grate constructed in accordance with the invention.

Fig. 2 is an end elevation partly in sections.

Fig. 3 is a side elevation of one of the fuel supports of the grate.

Fig. 4 is a plan view of the cooking utensil support.

Fig. 5 is a fragmentary horizontal sectional view through the grate.

Similar reference characters indicate corresponding parts throughout the several views in the drawings.

Referring to the drawing in detail, the grate comprises a front guard section A, fuel supports B, and a cooking utensil support C, which supports are adjustably and detachably connected with the front guard section A in a manner presently described.

The front guard support A comprises a lattice-like frame 10 formed at its lower edge with a pair of legs 11, provided with feet 12, which rest upon the bottom of the fire place or hearth for supporting the front section A, the frame 10 being formed with a series of spaced parallel bars 13. The upper edge of said frame is fluted at 14, and also provided with rows of openings 15 for giving ornamentality to the section A of the grate.

The bars 13 are formed with upper and lower opposed pairs of notches 16 and 17 respectively for a purpose presently described.

The fuel supports B which are preferably two in number, each comprise a horizontally arranged bar 18, which is formed near its rear end with a depending leg 19, while near the front end of said bar 18 is provided a vertical upright post 20, which together with the front end of the bar 18, are formed with locking heads 21, which are adapted for detachable engagement in the notches 17 for locking engagement with pairs of bars 13, adjacent each other of the frame 10, thereby detachably connecting the fuel supports B with the front section A of the grate, as is clearly shown in Figs. 1, 2 and 5 of the drawing.

In Figs. 1 and 4 there is shown a cooking utensil support C which comprises a disk 22 formed with a shank which is provided adjacent the outer end with opposed recesses forming a locking head 23, and this head is adapted for detachable engagement in the opposed notches 17, between a pair of adjacent bars 13 of the series in the frame 10 of the front section A of the grate for the mounting of the cooking utensil support C thereon, so that the same will hold the cooking vessel within the grate for the cooking of the contents of the vessel.

The fuel to be burned in the grate, which is preferably log wood, is placed upon the supports B, while the cooking utensil or vessel is placed upon the support C for the cooking of the contents thereof on the lighting of the fuel.

It will be obvious that the grate can be readily adjusted to fit different sizes of fire places, and also that the same can be readily knocked down for dis-use.

From the foregoing, it is thought that the construction and manner of operation of the grate will be clearly understood, and therefore a more extended explanation has been omitted.

What is claimed is:—

The combination, in a device of the kind described, of a lattice-like frame composed of series of spaced parallel bars vertically disposed, the said bars being formed adjacent their upper and lower ends and in their edges with notches, so that the notches in adjacent bars are oppositely disposed with respect to each other, feet by means of which the lattice frame is supported, and a pair of fuel supports each of which consists of a horizontally disposed bar formed near one end with a depending leg and provided at the other end with a vertically disposed upright post, the vertical post and horizontally disposed bar of each fuel support being formed with a pair of locking heads adapted to pass through the spaces provided by the opposed notches in the bars of the latch-like frame, the locking heads being formed on opposite sides with slots in which the facing edges of the bars of the lattice-like frame may engage, whereby the lattice-like frame may be supported in upstanding position and the fuel supports held in a position to retain fuel, as herein shown and specified.

In testimony whereof I affix my signature.

WILLIAM ARCHER PERKINS.

Copies of this patent may be obtained for five cents each, by addressing the "Commissioner of Patents, Washington, D. C."